No. 833,341. PATENTED OCT. 16, 1906.
T. ROWE.
COVER ACTUATING MEANS.
APPLICATION FILED MAY 13, 1905.
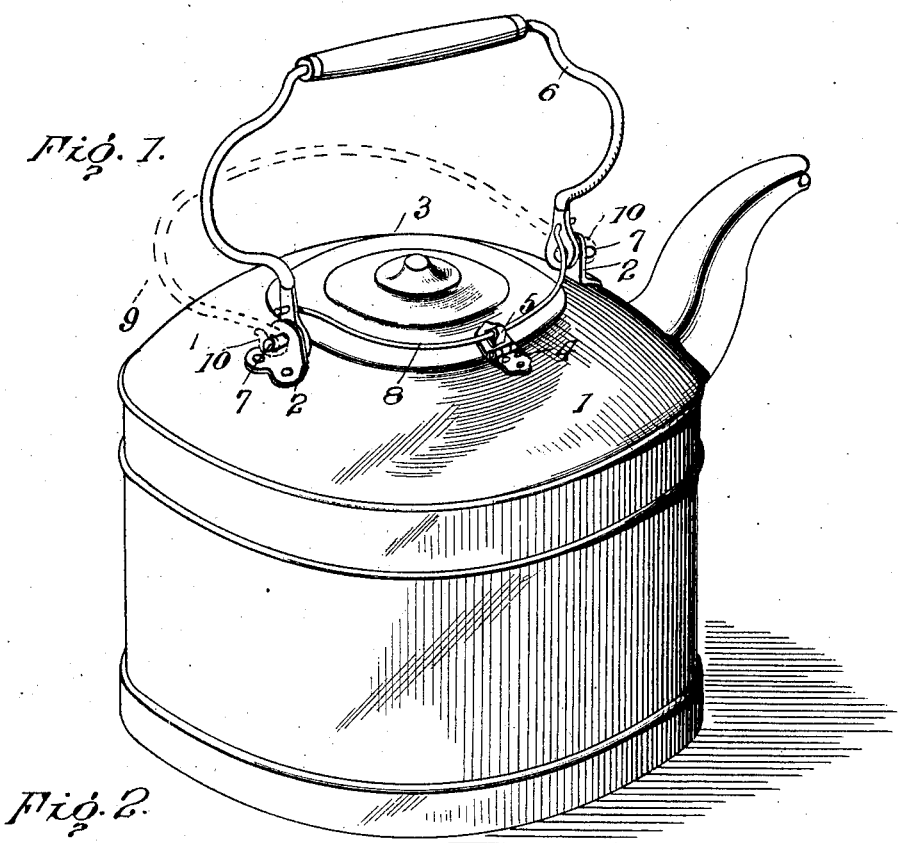
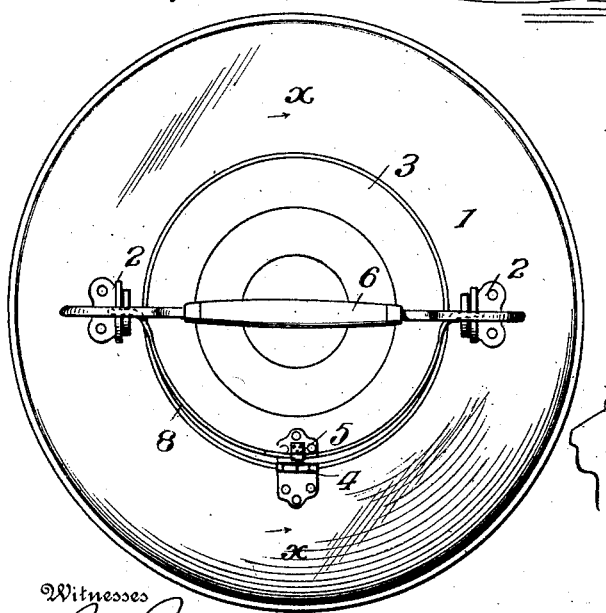
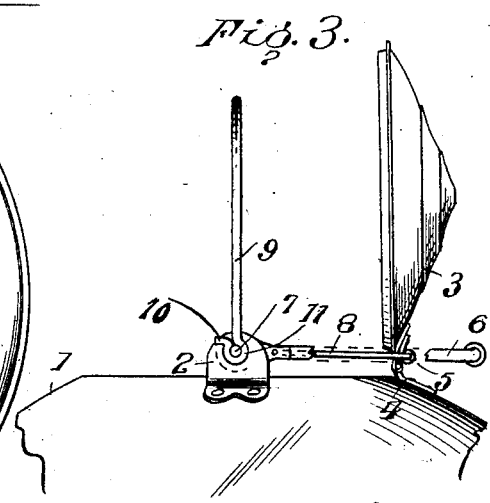
Inventor
Thomas Rowe.
Witnesses
By
Attorneys

UNITED STATES PATENT OFFICE.

THOMAS ROWE, OF DOLLAR BAY, MICHIGAN.

COVER-ACTUATING MEANS.

No. 833,341.　　　Specification of Letters Patent.　　　Patented Oct. 16, 1906.

Application filed May 13, 1905. Serial No. 260,328.

*To all whom it may concern:*

Be it known that I, THOMAS ROWE, a citizen of the United States, residing at Dollar Bay, in the county of Houghton and State of Michigan, have invented certain new and useful Improvements in Cover-Actuating Means, of which the following is a specification.

This invention relates to an attachment for tea-kettles and similar articles; and it consists, essentially, of a cross-bar connecting the two arms of the handle and having operative connection with the cover of the kettle, whereby the same is opened and closed by lowering and raising the handle.

It has for its object to produce a device which will hold the handle out of contact with the heated portion of the kettle, and therefore prevent its becoming overheated and disagreeable to handle, which will enable the cover to be opened and closed without burning the fingers, and which will do away with the knob or handle on the cover which so frequently works loose and is lost.

Reference is to be had to the accompanying drawings, in which—

Figure 1 is a perspective view showing the device as applied. Fig. 2 is a top plan view with the cover closed. Fig. 3 is a transverse sectional view showing the cover open.

Corresponding and like parts are referred to in the following description and indicated in all the views of the drawings by the same reference characters.

The numeral 1 indicates the body of the kettle, which is provided with ears 2 for the attachment of the handle and with the cover 3, which is fastened thereto by means of a hinge 4. This hinge has an outwardly-projecting eye 5 attached to that portion which is fastened to the cover 3. This eye 5 may be formed in any suitable manner, but is preferably formed, as shown in the drawings, by a strip of metal which is riveted to the hinge and bent upward and then looped. The handle 6 is pivoted upon the pin 7, fastened in the ears 2, and has its arms joined by a cross-bar 8, which passes through the before-mentioned eye 5. The handle 6 and cross-bar 8 are so placed in relation to each other that when the cover is closed the handle will be in an upright position, and by turning the handle down the cover will be opened. It will be readily observed that the handle has but a limited motion, in that it can only swing on one side, and that it will be prevented from coming into contact with the heated body of the kettle. In order that the kettle may be handled or hung upon a faucet when the cover is open, a supplemental handle 9 is provided, which is formed by bending a piece of wire or metal so as to form eyes 11 at its ends, the extreme ends being bent out to form lugs or heels 10. This supplemental handle is attached to the kettle by springing the eyes 11 over the pins 7, which project from the ears 2 and swings in an opposite direction to the handle 6. The lugs or heels 10 are adapted to engage with the top of the kettle when the handle is lowered in order to prevent same from coming into contact with the heated portion of the kettle. This supplemental handle 9 can be very quickly attached and detached and need, therefore, only be used when required.

From the foregoing description it will be readily understood that I have produced a device which will be a great convenience in the kitchen and which is so simple and durable in construction as to be cheaply manufactured and placed upon the market.

Having thus described the invention, what is claimed as new is—

In combination with a receptacle and the cover for closing the opening thereof, of the usual main handle, means connecting said handle with the cover for opening the latter when the handle is swung downwardly into an inoperative position, and a supplemental handle for the receptacle arranged for use when the cover is open and the main handle is in an inoperative position for supporting the receptacle.

In testimony whereof I affix my signature in presence of two witnesses.

THOMAS ROWE. [L. S.]

Witnesses:
　NONCE STETTER,
　PATRICK H. KINDELAN.